United States Patent [19]

Yamagishi et al.

[11] Patent Number: 5,506,182
[45] Date of Patent: Apr. 9, 1996

[54] MODIFIED ZEOLITE Y CATALYST COMPOSITION

[75] Inventors: Koji Yamagishi; Satoshi Nakai; Akira Iino, all of Sodegaura, Japan

[73] Assignee: Idemitsu Kosan Co., Ltd., Tokyo, Japan

[21] Appl. No.: 217,985

[22] Filed: Mar. 25, 1994

[30] Foreign Application Priority Data

Apr. 7, 1993 [JP] Japan .................................. 5-103720

[51] Int. Cl.$^6$ ...................................................... B01J 29/06
[52] U.S. Cl. .................................. 502/66; 502/64; 502/79
[58] Field of Search .................................... 502/64, 66, 79

[56] References Cited

U.S. PATENT DOCUMENTS

| | | | |
|---|---|---|---|
| 3,269,934 | 8/1966 | Hansford et al. | 208/111 |
| 4,021,331 | 5/1977 | Ciric | 208/111 |
| 4,738,940 | 4/1988 | Dufresne et al. | 502/66 |
| 4,820,402 | 4/1989 | Partridge et al. | 208/111 |
| 5,034,363 | 7/1991 | Petit et al. | 502/61 |
| 5,217,940 | 6/1993 | Halabi et al. | 502/355 |

FOREIGN PATENT DOCUMENTS

| | | |
|---|---|---|
| 0351312 | 1/1990 | European Pat. Off. . |
| 0421422 | 4/1991 | European Pat. Off. . |
| 0458414 | 11/1991 | European Pat. Off. . |
| 58-207949A | 2/1983 | Japan . |
| 58-147495A | 9/1983 | Japan . |
| 60-225646A | 11/1985 | Japan . |
| 4-12317B | 3/1992 | Japan . |

OTHER PUBLICATIONS

Database WPI, Derwent Publications Ltd., London, GB; AN 88–168333, M. Weber, "Lower Olefin Prodn. from Methanol or Dimethyl–Ether", of DD–A–253 611, 27 Jan. 1988.

*Primary Examiner*—Michael Lewis
*Assistant Examiner*—Thomas G. Dunn, Jr.
*Attorney, Agent, or Firm*—Frishauf, Holtz, Goodman, Langer & Chick

[57] ABSTRACT

A catalyst composition comprising a modified zeolite and a binder mixed with a high degree of mixing has high hydrothermal resistance and exhibits high activities in various catalytic reactions, including various hydrocarbon-conversion reactions, and the catalyst composition is prepared by mixing a slurry of a modified zeolite and a slurry of a binder material.

10 Claims, No Drawings

MODIFIED ZEOLITE Y CATALYST COMPOSITION

BACKGROUND OF THE INVENTION (a) Field of the Invention

The present invention relates to a novel catalyst composition which contains a zeolite composition improved in catalytic properties or the zeolite composition and metal component having hydrogenation activity.

(b) Description of the Related Art

Catalysts containing zeolites have been used extensively in catalytic reactions, for example, various conversion reactions of hydrocarbons, such as hydrogenolysis, including hydrocracking, catalytic cracking, isomerization, alkylation, dealkylation, disproportionation, olygomerization, aromatization, hydrogenation, dehydrogenation and reforming, and, further, conversions of oxygen-containing hydrocarbons, such as methanol, and hydrogenation of carbon monoxide. The zeolites to be used in these reactions as catalysts or catalyst components have generally been modified to control or improve the catalytic properties, such as acidity or hydrothermal resistance. There have been proposed various methods for modifying zeolites. The most conventional modification is dealumination, which provides various modified zeolites which are controlled or improved in acidity or hydrothermal resistance. Dealumination has been performed by various methods, for example, gaseous phase dealuminations, such as steaming and treatment with gases containing hydrochloric acid, and wet dealuminations, such as treatment with aqueous mineral acid solutions and treatment with various aqueous metal salt solutions. Zeolites have been modified by not only these dealuminations but also other methods, for example, substitution of a part of Si or Al in zeolite lattice with other atoms, such as Ti, Ga or Fe.

Dealumination generally has the effects of increasing acid strength per acid point of zeolites and improving the hydrothermal resistance of zeolites themselves, but has a shortcoming of decreasing active points (particularly acidity).

Also, zeolites have generally been mixed with binders, such as alumina, to improve mechanical strength of catalysts. Further, loading of compositions comprising zeolites and alumina (or zeolites alone) with hydrogenation metals, such as metals of Groups VIA and VIII of the Periodic Table, is a conventional means for imparting the catalysts with not only acidity but also sufficient hydrogenation properties.

These are no more than typical examples of various conventional methods of modifying zeolites and preparing catalysts to improve catalytic properties of zeolites-containing catalysts, and there are many other reports concerning hydrocarbon conversion catalysts alone.

As to known catalysts containing non-dealumination type zeolites, U.S. Pat. No. 3,269,934 and U.S. Pat. No. 4,021,331 describe hydrocracking catalysts containing hydrogen-type ($H^+$-type) of zeolite Y or ZSM-20. These zeolites however have a $SiO_2/Al_2O_3$ ratio of 8 or less, and the too much Al content causes various problems, such as insufficiency in acidity and hydrothermal resistance, requiring further modification, such as the dealumination described above.

As to known catalysts containing zeolites modified by dealumination, Japanese Patent Application Kokai Koho (Laid-open) Nos. 58-147495 and 58-207949 and Japanese Patent Application Kokoku Koho (Publication) No. 4-12317 describe methods of catalytic cracking of hydrocarbons by using catalysts which are prepared by using dealuminated zeolites having expanded pores. Although these zeolites are improved in thermal resistance and acidity by the dealumination as described above, the catalytic activities are decreased due to a decrease in the acid density of the zeolites themselves.

Japanese Patent Application Kokai Koho (Laid-open) No. 60-225646 describes hydrocracking by using catalysts which are prepared by mixing a dealuminated zeolite with a binder, such as alumina, and loading the resulting composition with transition metals having hydrogenation function. Even the binder, however, has almost no effect of improving catalytic activities, and the shortcomings of dealumination as described above cannot be solved, with the low catalytic activities remaining as they are. This means that the binder works merely as a dispersant of the zeolite, and the catalytic activities depend on the dealuminated zeolite whose active points are decreased by the dealumination.

ABSTRACT OF THE INVENTION

An object of the present invention is to provide a novel catalyst composition which is a high efficiency zeolite-containing catalyst composition having sufficient hydrothermal resistance and high catalytic activities in various catalytic reactions, such as various hydrocarbon conversion reactions.

The inventors studied mainly the modification of zeolites, particularly, the means of solving the decrease in activities due to the dealumination. They came up to an idea that if a binder is mixed with a modified zeolite sufficiently so that not only the binder works as a dispersant, but improves the chemically catalytic functions of the zeolite, the modified zeolite with activities decreased by the dealumination or the like may be improved in catalytic properties including activities. Upon repeated investigations and examinations based on the idea, they found that the object can be attained by a specific method wherein a modified zeolite having specific properties and a binder containing an aluminum component, particularly an alumina component, are slurry mixed with each other, and they have consequently completed the present invention.

That is, the present invention provides a catalyst composition, comprising 10 to 90% by weight of a modified zeolite (II) and 10 to 90% by weight of a binder (III) in a degree of mixing of not less than 0.5, the catalyst composition having a clear absorption peak in IR spectrum within a wavenumber range of $3602\pm5$ $cm^{-1}$, having a pore size distribution which has a maximum value within a range of 5 to 50 nm and a maximum value within a range of 50 to 1000 nm, having a total pore volume of not less than 0.3 ml/g, containing not less than 25% by volume of pores of 5 to 50 nm in pore size based on total volume of pores of 5 to 1000 nm in pore size, containing not less than 10% by volume of pores of 50 to 1000 nm in pore size based on total volume of pores of 5 to 1000 nm in pore size and being prepared by mixing a slurry (bS) of a binder material and a slurry (zS) of a modified zeolite (I), the binder material containing an aluminum compound, the modified zeolite (I) having a $SiO_2/Al_2O_3$ molar ratio of not less than 7, having no clear absorption peak in IR spectrum within a wavenumber range of $3602\pm5$ $cm^{-1}$, containing not more than 14% by weight of four-coordinate Al in zeolite crystal lattice, as measured by a solid NMR method, having a relative crystallinity measured by X-ray powder diffraction analysis of not less than 40% relative to unmodified zeolite and containing not less than 20% by volume of pores of 3 to 30 nm in pore size based on total pore volume, the modified zeolite (II) being derived from at least the binder material, containing four-coordinate Al in zeolite crystal lattice in an amount which is increased by not less than 0.1% by weight as compared with the content of the four-coordinate Al in zeolite crystal lattice of the modified zeolite (I), having a relative crystallinity measured by X-ray powder diffraction analysis of not less than 35% relative to the unmodified zeolite and having a U.D. value which is increased by not less than 0.001 nm as compared with the U.D. value of the modified zeolite (I), and the binder (III) being derived from the binder material.

The catalyst composition of the present invention is prepared by the specific method of mixing at least the slurry (bS) of the binder material containing the aluminum compound and the slurry (zS) of the modified zeolite (I) having the specific composition and properties. The mixing of the slurry (bS) and the slurry (zS) enables uniform mixing of the modified zeolite (I) and the binder material, resulting in a catalyst composition with a high degree of mixing. The slurry mixing causes not only a physical mixing but also a chemical reaction wherein at least a part of aluminum atoms of the binder material transfer to the modified zeolite (I). In other words, at least a part of the modified zeolite (I) is chemically modified by the aid of the binder material. Therefore, the modified zeolite which is present in the resulting catalyst composition and corresponds to the modified zeolite (I) is herein referred to as "modified zeolite (II)", to distinguish it from the modified zeolite (I). Also the binder component in the resulting catalyst composition is referred to as "binder (III)" to distinguish it from the binder material in the slurry (bS) since the two are different from each other at least partially.

The properties or characteristic values which specify the modified zeolite (I) used in the slurry (zS) and the objective catalyst composition or the modified zeolite (II) were measured and evaluated by the following methods (a) to (f).

(a) IR spectrum: The IR spectrums of the modified zeolite (I) and the catalyst composition were measured by pressure molding 30 mg of a powdery sample at 5,000 psi into a wafer of 15 mm in diameter, removing physically adsorbed water from the wafer by heating at 450° C. for one hour at a pressure of $1.0\times10^{-4}$ Hg or lower, cooling the wafer to room temperature without contact with absorbable materials, and then carrying out the measurement with an JIR 100 X-type infrared spectrometer (Trade name, produced by Nippon Denshi Kabushiki Kaisha) by transmission system. Each IR spectrum disclosed hereinafter was measured by this method.

(b) The content of four-coordinate Al in zeolite crystal lattice: The concentration (content) of four-coordinate Al constructing zeolite crystal can be determined by measuring the solid NMR spectra of $^{29}$Si and $^{27}$Al. The content of four-coordinate Al in the zeolite crystal lattice of each of the modified zeolites [the modified zeolite (I) and the modified zeolite (II) that is present in the catalyst composition] was measured and evaluated by carrying out NMR analysis with a GX 270-type NMR analyzer (Trade name, produced by Nippon Denshi Kabushlki Kaisha) and determining the content of the four-coordinate Al according to the wave analysis of solid NMR spectra of $^{29}$Si and $^{27}$Al that is disclosed in the report of C. A. Fyfe, et al., *Angew. Chem.*, Vol. 95, P. 257 (1983). Each content of four-coordinate Al disclosed hereinafter was measured by this method.

(c) Relative crystallinity: The relative crystallinity of each of the modified zeolites [the modified zeolite (I) and the modified zeolite (II) that is present in the catalyst composition] was determined by carrying out X-ray analyses (powder diffraction method) of the unmodified zeolite and the modified zeolite (I) or the catalyst composition under the same condition, and then comparing in the X-ray diffraction spectra the relative strength of the peaks that characterize zeolite crystal structure. In practice, the comparison was carried out by employing the total of the heights of five strongest peaks characterizing zeolite crystal structure. For example, in the case of zeolite Y, the total of the heights of five peaks corresponding to Miller indices of 331, 440, 533, 642 and 555 was employed. The relative crystallinity of each modified zeolite is calculated using the following equation. Relative crystallinity %=[(total of the heights of five d-peaks of the modified zeolite)÷(total of the heights of five d-peaks of the unmodified zeolite)]×100.

The same method was employed for other kinds of zeolites. The relative crystallinity of each modified zeolite disclosed hereinafter was measured by this method.

(d) Pore size distribution and pore volume: The pore size distribution of the modified zeolite (I) was measured by a nitrogen-gas-adsorption method (BJH method) by using BELLSORB 28 (Trade name, produced by Nippon Bell Kabushiki Kaisha). The pore size distribution of the catalyst composition comprising the modified zeolite and the binder was measured by employing both the BJH method and the mercury-press-in method. Each pore volume was calculated from the pore size distribution data thus obtained, according to the conventional method. Each pore size distribution and each pore volume disclosed hereinafter were measured by these methods.

(e) Degree of mixing: The degree of mixing of the modified zeolite component [modified zeolite (II)] and the binder component [binder (III)] in the catalyst composition was measured and evaluated as follows. The section of a catalyst composition particle is observed with an EPMA (X-ray probe microanalyzer) to investigate the distribution of the modified zeolite component and the binder component. In general, the distribution of the modified zeolite component is evaluated from the concentration distributions of Si and Al, and the distribution of the binder component was evaluated from the concentration distribution of Al alone or of Al and other elements constructing the binder. The ratio of Al to Si was also employed to evaluate binder components further containing Si. These EPMA data were statistically analyzed, and the degree of dispersion of the objective component was obtained from the standard deviation of the distribution of the objective component. The degree of mixing was calculated from the degree of dispersion using the following formula.

Degree of mixing=$1-(\sigma/\sigma^o)$

In the formula, $\sigma$ represents the degree of dispersion of the objective component, and $\sigma^o$ represents the degree of dispersion resulting from ideal (perfect) mixing. $\sigma^o$ is calculated using a formula, $\sigma^o=[(1-X)X]^{1/2}$, X being the percentage of the modified zeolite component in the total of the modified zeolite component and the binder component that are present in the catalyst composition. Therefore, the degree of mixing between the modified zeolite (II) and the binder (III) in the catalyst composition generally ranges from 0 to 1, a degree of mixing of 0 meaning perfect separation, and a degree of mixing of 1 meaning perfect mixing.

Each degree of mixing disclosed hereinafter was measured and evaluated by this method.

(f) U. D. values of zeolites: The U. D. (Unitcell Dimension) value of each of the modified zeolites [the modified zeolite (I) and the modified zeolite (II) that is present in the catalyst composition] was calculated by using an X-ray diffraction chart according to the method described in the ASTM list D3.942-80. A sufficiently high crystallinity of the sample is required to increase the accuracy of the U. D. value.

It is important that the catalyst composition of the present invention is prepared by mixing at least the slurry [slurry (bS)]of the binder material containing the aluminum compound and the slurry [slurry (zS)] of the modified zeolite that is characterized at least by the following (1) to (5), and it is also important that the resulting catalyst composition of the present invention contains the zeolite-containing composition characterized by the following (i) to (vii).

There is no other limitation than the limitation described above, and the catalyst composition of the present invention may be endowed with various catalytic functions by employing various techniques, including the techniques of preparing the modified zeolite (I) and other techniques, such as dealumination and metal loading, which are conventional for the preparation of zeolite catalysts or zeolite-containing catalysts.

The catalyst composition of the present invention contains a novel zeolite-containing composition comprising a binder component and a modified zeolite which is excellent in stability, such as hydrothermal resistance, and has excellent catalytic properties, such as excellent acid properties as compared with the conventional modified zeolites. The catalyst composition, according to demands, may further contain active metal components (such as metals of Groups VIA or VIII of the Periodic Table) having various catalytic functions, such as hydrogenation function, and allows the active metal components to function more effectively as compared with the conventional catalyst compositions. The catalyst composition of the present invention therefore can be used advantageously in much more catalytic reactions (such as various hydrogenation, including catalytic cracking, hydrodesulfurization, hydrocracking and hydrocracking accompanied by hydrodesulfurization) than those to which the conventional zeolites, including modified zeolites, or zeolite-containing catalyst compositions are applicable.

PREFERRED EMBODIMENTS OF THE INVENTION

[Binder material and slurry (bS)]

The binder material to be used in the slurry (bS) may be selected from various ones including known binders for zeolites so far as it contains an aluminum compound. Generally preferred are inorganic binder materials containing inorganic aluminum compounds, for example, alumina-containing oxides, such as alumina, silica-alumina, alumina-boria, silica-alumina-thoria, silica-alumina-zirconia and silica-alumina-magnesia, and aluminum-containing clays, such as montmorillonite. Particularly preferred are alumina, silica-alumina, alumina-boria and aluminate- or aluminoslll-cate-clay minerals, such as montmorillonite. These binders may be used individually or as a mixture of compound or two or more.

The slurry (bS) contains at least one binder material, and the medium (liquid) of the slurry is generally water or various aqueous mediums. The slurry (bS) may be prepared by various methods, for example, by dispersing uniformly a powdered binder material in water or an aqueous medium, or slurries obtained in the course of the synthesis of synthetic binders, such as alumina, may be used as that are or after adjustment of the composition, such as water content. For example, in the case of alumina, alumina gel slurries, such as pseudoboehmite gel slurry, obtained by hydrolyzing various aluminum compounds may be used as the slurry (bS) or for the preparation thereof.

It is generally preferable that the slurry (bS) contains fine grains of the binder material to impart the modified zeolite with sufficient degree of mixing, and the preferred grain size is generally not greater than 200 μm. A too large grain size of the binder material in the slurry (bS) may cause a difficulty in performing uniform mixing or reaction with the modified zeolite (I) that is used in the form of the slurry (zS).

At the time of mixing the slurry (bS) with the slurry (zS), it is preferable to adjust the water content in the slurry (bS) properly. The water content will be described later.

In the slurry (bS), according to demands, may be dissolved or introduced other components, for example, those for improving dispersibility or metal components for producing desired catalytic functions, such as metals or metal compounds of Groups VIA or VIII of the Periodic Table, which will be described later.

[Modified zeolite (I) and slurry (zS)]

It is important that the modified zeolite (I) in the slurry (zS) has the following characteristics (1) to (5). That is, the modified zeolite (I)

(1) has a $SiO_2/Al_2O_3$ molar ratio of not less than 7, (2) has no clear absorption peak in IR spectrum within a wavenumber range of $3602\pm5$ cm$^{-1}$ [(the IR spectrum is measured by the above-described method (a)], (3) contains not more than 14% by weight of four-coordinate Al in zeolite crystal lattice, as measured by a solid NMR method [the content of four-coordinate Al is measured and evaluated by the above-described method (b)], (4) has a relative crystallinity measured by the X-ray powder diffraction analysis of not less than 40% relative to unmodified zeolite [the relative crystallinity is measured and evaluated by the above-described method (c)], and (5) contains not less than 20% by volume of pores of 3 to 30 nm in pore size based on total pore volume [the pore size distribution is measured and evaluated by the above-described method (d)].

Using modified zeolites or unmodified zeolites which do not satisfy all the conditions (1) to (5) causes the following difficulties or problems, so that it will be difficult to obtain the catalyst composition of the present invention, that is a zeolite-containing composition and a catalyst composition containing the same which satisfy the conditions (i) to (vii).

When zeolites which do not satisfy the condition (1), even those modified by dealumination or the like, are used, the resulting catalyst composition does not have sufficient stability, such as sufficient hydrothermal resistance.

With respect to the IR characteristics of (2), attention should be paid to the following matters.

It has been understood to be usual with modified zeolites whose hydrothermal resistance and acidity are controlled sufficiently by dealumination or the like that the IR spectrum thereof has no clear absorption peak within the wavenumber range of $3602\pm5$ cm$^{-1}$ In other words, as to the conventional modified zeolites alone, clear spectra in the wavenumber range have been deemed to show insufficient dealumination (modification). In the case where the conventional modified zeolites have been sufficiently dealuminated but have no clear spectrum within the wavenumber range, the modified zeolites have a very low acid density, which has also been a significant disadvantage of the conventional modified zeolites or catalyst compositions thereof, as described in the paragraph of disclosure of the related art.

Even zeolites which satisfy the condition (1) will have too high content of Al in zeolite crystal lattice if the zeolites do not satisfy the condition (3), so that even dealumination (modification) will not be effective in decreasing the content of Al in zeolite crystal lattice, causing a difficulty in producing catalyst compositions having satisfactory properties, including hydrothermal resistance.

Even if modification, such as dealumination, is performed sufficiently, zeolites which do not satisfy the conditions (4) and (5) will be too large in the diameter of zeolite crystal or too poor in the substantive content of zeolite due to the destruction of zeolite crystal to perform sufficient mixing (reactive mixing) with binders or to exhibit catalytic functions peculiar to zeolites. That is, it is difficult to produce catalyst compositions having objective characteristics from such zeolites.

Therefore, using the modified zeolite satisfying all the conditions (1) to (5), namely the modified zeolite (I), as a material enables the production of zeolite-containing compositions having desired excellent properties and facilitates the production of the catalyst composition of the present invention.

The modified zeolite (I) to be used in the slurry (zS) may be prepared from any kind and composition of zeolite or may have been modified by any method, so far as the modified zeolite (I) satisfies the conditions (1) to (5).

Starting zeolites which may be used for the preparation of the modified zeolite (I) include various natural zeolites, synthetic zeolites and mixtures thereof with any ratios. Some examples include zeolite Y, zeolite X, zeolite L, Beta, Omega, moderate, synthetic zeolites, for example pentasil zeolites, such as ZSM-5, and natural mineral zeolites, such as natural faujasites and clinoputirite. Particularly preferred is zeolite Y.

Although the modified zeolite (I) should have a $SiO_2/Al_2O_3$ molar ratio of not less than 7, the starting zeolite does not necessarily have a $SiO_2/Al_2O_3$ molar ratio of not less than 7 since the molar ratio can be increased to 7 or higher by dealumination modification. However, a too low $SiO_2/Al_2O_3$ molar ratio necessitates deep dealumination by a lengthy dealumination treatment under severe conditions, which requires high cost and may cause problems, such as the destruction of zeolite crystal during the dealumination.

The preferred $SiO_2/Al_2O_3$ molar ratio of the starting zeolite depends significantly on the conditions of modification, particularly dealumination by acid treatment, and cannot be defined uniformly. A $SiO_2/Al_2O_3$ molar ratio of not less than 3.5 is preferable. However, it is desirable to select the preferred $SiO_2/Al_2O_3$ molar ratio depending on the conditions of modification, particularly dealumination.

These starting zeolites may be of various cation (exchanged) types, and the cations may be any kinds of ion-exchangeable cations, including $Na^+$, $K^+$, $NH_4^+$, $H^+$, organic ammonium ions and $Ca^{2-}$, and these cations may be exchanged partially or wholly by other cations, for example, metal ions of Group VIII, such as $La^{3+}$, $Ce^{3+}$, $Co^{2+}$, $Ni^{2+}$ or $Fe^{2+}$. Also these starting zeolites may be of mixed types containing two or more cations. Particularly preferred examples include $NH_4$-zeolite Y, H-zeolite Y, $NaNH_4$-zeolite Y and $HNaNH_4$-zeolite Y.

In order to obtain the modified zeolite (I) having the relative crystallinity as defined in the above (5), it is desirable to select from these various cation-type zeolites a starting zeolite which is tolerable to the destruction of zeolite crystal lattice due to the dealumination treatment for modification. For example, cation-type zeolites having $Na^{30}$ ions preferably have a $Na_2O$ content of not more than 8.0% by weight since too much $Na_2O$ cannot allow the dealumination without the destruction of crystal. It is however desirable to select the $Na_2O$ content depending on the conditions of modification, particularly dealumination by acid treatments, since the preferred $Na_2O$ content also depends on such conditions.

Also the various zeolites to be used as the material of the modified zeolite (I) may be ones wherein Al and Si in zeolite crystal lattice are partially substituted by other metals, such as re, Ti and Ga. These zeolites may be used individually or, according to demands, may be used as a mixture of two or more.

The modified zeolite (I) characterized by the above (1) to (5) may be prepared by subjecting the above various starting zeolites to various treatments for modification. The modification as used herein is not necessarily limited to dealumination, but a modification including dealumination is preferable. The modification including dealumination improves at least the hydrothermal resistance of zeolites to stabilize and is as well effective to acidity control. In addition to the dealumination, substitution of Al or Si in zeolite lattice with other atoms (substitution of T-atoms) or partial or complete exchange of exchangeable cations with desired metal ions also may be carried out to impart the modified zeolite (I) with catalytic functions at this stage.

Some examples of the modification treatments suitable for the stabilization of the zeolite, such as the improvement in the hydrothermal resistance and for the control of acidity include steaming, treatments with acidic gases, such as gases containing gaseous hydrochloric acid, wet acid treatments with mineral acids or organic acids and treatments with aqueous metal salt solutions together with proper pH adjustment. Vesting of catalytic functions peculiar to metals may also be performed by the treatments with aqueous metal salt solutions. These modification treatments may be carried out in combination of two or more, simultaneously or step by step.

The followings are the examples of the preparational methods particularly suitable for the modified zeolite (I) or the slurry thereof.

1.1. Modification by steaming

Steaming zeolites, such as the starting zeolites described above, is effective in stabilizing the zeolites, for example, in improving the hydrothermal resistance.

The steaming (stabilization treatment by steaming, such as dealumination) may be carried out according to conventional methods, and the following conditions are generally suitable.

It is generally desirable to carry out the steaming at a partial pressure of steam (steam content in the steaming atmosphere) of 0.01 to 1 $kg/cm^2$, at 300° to 900° C., preferably 550° to 800° C. The steaming may be performed by a self-steaming.

Preferred steaming time depends on other conditions, such as temperature, the partial pressure of steam and the kind of zeolite used, and is generally 0.1 to 5.0 hours, preferably 1.0 to 4.5 hours.

If the modified zeolite (I) satisfying the conditions (1) to (5) is obtained by the steaming, the modified zeolite (I) obtained may be dispersed in water or a proper aqueous solution to use as the slurry (zS).

It is however generally preferable to subject the steamed zeolite to the following wet acid treatment to remove more effectively a part of the aluminum of the zeolite remaining inside and outside the lattice.

1.2. Wet acid treatment

The wet acid treatment, fundamentally, may also be carried out according to conventional methods. Various acids may be used for the wet acid treatment, for example, various inorganic acids (mineral acids), such as hydrochloric acid, nitric acid, sulfuric acid, phosphoric acid, peroxodisulfuric acid, dithionic acid, sulfamic acid, nitrosylsulfuric acid and nitrosulphonic acid, and organic acids, preferably water-soluble ones, such as formic acid, oxalic acid, trichloroacetlc acid, trifluoroacetic acid and sulfonic acids. Preferred acids include hydrochloric acid, nitric acid and sulfuric acid. These may be used individually or, according to demands, in combination of two or more.

These acids are generally used in an amount of 0.1 to 20 mol, preferably 6 to 16 mol, per kg of the starting zeolite. Less than 0.1 mol of the acid per kg of the starting zeolite cannot perform dealumination satisfactorily, and if the amount of the acid exceeds 20 mol, the destruction of zeolite crystal will be so severe that it cannot be disregarded. It is generally preferable to use these acids as aqueous solutions. Although the preferred concentration of the aqueous acid solutions cannot be defined uniformly since it depends on the kind or properties of the zeolite to be treated, the preferred concentration is generally 3 to 20% by weight.

It is generally desirable to carry out the acid treatment at around room temperature (for example 20° C.) to 100° C., preferably 30° to 90° C. A treating temperature of lower than room temperature requires cooling apparatuses which increase the cost. A treating temperature of higher than 100° C. may be employed, but causes difficulties in operation and in the control for pertaining the modified zeolite (I) with predetermined properties.

The treating time is generally about 0.1 to 12 hours, preferably about 0.5 to 10 hours.

Although the modified zeolite (I) satisfying the conditions (1) to (5) can also be obtained by carrying out this wet acid treatment under proper conditions on zeolites which have not undergo the above steaming, it is generally preferable to carry out the acid treatment on the zeolite subjected to the above steaming.

That is, the modified zeolite (I) satisfying the conditions (1) to (5) can be obtained easily by the acid treatment following the steaming.

In general, the modified zeolite (I) dealuminated by the acid treatment is preferably washed with water to remove needless components. The modified zeolite (I) washed may be collected in a form of slurry, which may be used as the slurry (zS) as it is or after the water content is adjusted. The modified zeolite (I) obtained, of course, may be collected in a form of solid particles, such as dried particles, which are then suspended in water or a proper aqueous solution to prepare the slurry (zS).

Prior to the preparation of the slurry (zS), the modified zeolite (I) may further be improved in the catalytic functions, for example, by loading or introducing desired metal components by various methods, such as the treatment with aqueous metal salt solutions described below.

1.3. Treatment with aqueous metal salt solutions (1)

The modified zeolite (I) prepared by the above steaming and/or the acid treatment or precursors thereof may be subjected to treatments with metal salts as described below, to load or introduce desired metal components therein, thereby improving the catalytic properties or giving desired catalytic functions. The modified zeolite (I) containing metal components may also be prepared by subjecting the precursors to this treatment.

For example, desired metal components are loaded or introduced into the zeolite dealuminated by the above methods or the like with high dispersity in high concentration by making the zeolite contact with an aqueous solution containing one or more salts (compounds) of metals selected from the group consisting of metals of Group VIA (particularly Mo and W) and Group VIII (Fe, Co, Ni, Ru, Rh, Pd, Os, Ir and Pt) of the Periodic Table, followed preferably by increasing the pH of the aqueous metal salt solution (treating liquid) with basic compounds, such as alkalis or basic nitrogen compounds, such as ammonia.

There is no particular limitation in the metal salts to be used ("metal salts" as used herein include even metal compounds which are not generally called salts, such as molybdic acid), and some examples include inorganic acid salts, such as chloride, sulfates, nitrates, organic acid salts, such as acetate, and various complex salts. As to Mo and W, the metal salts further include oxyacids and salts thereof, such as ammonium molybdates, ammonium tungstate, molybdic acids, molybdenum oxides and heteropoly-acids. These may be used individually or, according to demands, two or more may be used as solution mixtures.

The concentration of total of the metal salts in the aqueous metal salt solution used is generally 0.1 to 3.0 mol/l, preferably 0.5 to 1.5 mol/l. A concentration of less than 0.5 mol/l is too low to load or introduce sufficient amounts of metal components, and a concentration of more than 1.5 mol/l may cause the formation of deposits, thereby disturbing loading or introduction of desired metal components with high dispersity.

The appropriate pH of the aqueous metal salt solution is generally 2.0 to 12.0, preferably 3.0 to 10.0. It is desirable to increase the initial pH of the aqueous metal salt solution when or after the zeolite comes to contact with the aqueous metal salt solution. For example, it is desirable to adjust initially the pH to 2.0–4.0, preferably 3.0–4.0, and then increasing the pH, for example, with alkalis, such as sodium carbonate or sodium hydroxide, aqueous ammonia or organic amines, to 12.0 or lower, preferably to 10.0 or lower (a treatment including pH-increase).

When pH is lower than 2.0, it is difficult to load or introduce sufficient amounts of metal components into the zeolite, and in an alkaline condition with a pH of more than 12.0, the crystal structure of the zeolite may be destroyed.

The desirable treating temperature is generally 10° to 100° C., preferably 30° to 90° C. Although a treating temperature of lower than 10° C. or higher than 100° C. may be employed, such a temperature causes difficulties in operation and in the control for obtaining the desired metal-containing modified zeolite (I).

The treating time is generally 0.1 to 12 hours, preferably about 0.5 to about 10 hours.

After the treatment with the aqueous metal salt solutions, needless components, such as surplus metal salts, are removed by filtration and washing with water, to obtain the desired slurry of the modified zeolite (I) [slurry (zS)].

The modified zeolite (I) may also be dried or calcined, and the slurry (zS) may be prepared by dispersing in water or a proper aqueous solution the modified zeolite (I) after the drying or calcination.

The treatment with aqueous metal salt solutions may be carried out simultaneously with dealumination. The following is an example of such a procedure.

1.4. Treatment with aqueous metal salt solutions (2)

According to this method, the modified zeolite (I) supporting or containing desired metal components with high dispersity is prepared by making a zeolite having a SiO$_2$/Al$_2$O$_3$ molar ratio of not less than 3.5, preferably not less than 4.5 and a Na$_2$O content of not more than 2.4% by weight with an aqueous metal salt solution of a pH of lower than 1.5 to load or introduce the desired metal components, while the zeolite is dealuminated by the contact with the aqueous metal salt solution having the pH of lower than 1.5. The aqueous metal salt solution to be used in this method contains at least one salt of at least one metal selected from the group consisting of metals of Group VIA (particularly Mo and W) and Group VIII (Fe, Co, Ni, Ru, Rh, Pd, Os, Ir and Pt) of the Periodic Table.

There is no particular limitation in the metal salts to be used ("metal salts" as used herein include even metal compounds which arc not generally called salts), and some examples include inorganic acid salts, such as chloride, sulfates, nitrates, organic acid salts, such as acetate, and various complex salts. As to Mo and W, the metal salts further include oxyacids and salts thereof, such as ammonium molybdates, ammonium tungstate, molybdic acids, molybdenum oxides and he teropoly-acids. These may be used individually or, according to demands, two or more may be used as solution mixtures.

The concentration of total of the metal salts in the aqueous metal salt solution used is generally 0.1 to 3.0 mol/l, preferably 0.5 to 1.5 mol/l. A concentration of less than 0.5 mol/l is too low to load or introduce sufficient amounts of metal components, and a concentration of more than 1.5 mol/l may cause the formation of deposits, thereby disturbing loading or introduction of desired metal components with high dispersity.

The pH of the aqueous metal salt solution is preferably lower than 1.5. When the pH is 1.5 or higher, the dealumination of the zeolite will be insufficient. After the dealumination is performed sufficiently, the pH of the treating liquid may be increased according to demands.

Since the zeolite treated by this method has a relatively high SiO$_2$/Al$_2$O$_3$ molar ratio and a low Na$_2$O content as described above, the contact with the aqueous metal salt solution under such a highly acidic condition with such a low pH does not destroy the crystal structure of the zeolite.

The desirable treating temperature is generally 10° to 100° C., preferably 30° to 90° C. Although a treating temperature of lower than 10° C. or high than 100° C. may be employed, such a temperature causes difficulties in operation and in the control for obtaining the desired metal-containing modified zeolite (I).

The treating time is generally 0.1 to 12 hours, preferably about 0.5 to about 10 hours.

Although this treatment may be performed merely by dipping the zeolite in the aqueous metal salt solution, it is desirable to agitate the mixture to shorten the time taken for the dealumination and the loading or introduction of the metal components. The dispersity and content of the metal components in the zeolite [metal-containing modified zeolite (I)] may be increased by repeating the treatment with the aqueous metal salt solution.

After the treatment with the aqueous metal salt solutions, the obtained zeolite is washed with water sufficiently according to conventional methods, to obtain desired slurry of the modified zeolite (I) [slurry (zS)].

The modified zeolite (I) may also be dried or calcined, and the slurry (zS) may be prepared by dispersing the modified zeolite (I) dried or calcined in water or a proper aqueous solution.

These methods described in the above 1.1. to 1.4. or combinations of these methods combined according to demands are suitable for the preparation of the modified zeolite (I) satisfying the conditions (1) to (5) or the slurry (zS) thereof. The method of preparing the modified zeolite (I), however, is not necessarily limited to those described above. If modified zeolites satisfying the conditions required by the modified zeolite (I) is available, such modified zeolites also may be used for the preparation of the slurry (zS).

In any case, the modified zeolite (I) is used in the form of the following slurry [slurry (zS)] for the preparation of the catalyst composition of the present invention.

[Mixing of the slurry (bS) with the slurry (zS)]

The preparation of the catalyst composition of the present invention comprises at least mixing the slurry of the above binder material [slurry (bS)] with the slurry of the above modified zeolite (I) [slurry (zS)].

The water content in the slurry (bS) to be used for the mixing is generally 65 to 99% by weight, preferably 70 to 90% by weight.

The water content in the slurry (zS) to be used for the mixing is generally 35 to 99% by weight, preferably 50 to 85% by weight.

The modified zeolite (I) is preferably dispersed in the slurry (zS) uniformly as fine grains, and appropriate grain size is generally not greater than 200 μm, preferably not greater than 100 μm.

The mixing ratio of the slurry (bS) to the slurry (zS) depends on the contents of the binder material and the modified zeolite (I) in these slurries, and is adjusted so that, in the objective catalyst composition, the weight ratio of the binder component [binder (III)] to the zeolite component [modified zeolite (II)] derived from the modified zeolite (I) [(III)/(II)] ranges from 1/9 to 9/1. Using the binder material and the modified zeolite (I), at the time of the slurry mixing, in a weight ratio of 1/9 to 9/1 generally produces a catalyst composition wherein the weight ratio of (III)/(II) does not deviate largely from the required range, but in the case where the weights of the two components change after the mixing, the ratio of the binder material to the modified zeolite (I) should be adjusted in consideration of the degree of the change.

The mixing of the slurry (bS) and the slurry (zS) is preferably carried out so that sufficient mixing can be performed. It is generally preferable to use a machine having a proper agitating mechanism, such as a kneader, a co-kneader, a pug mill, a static mixer or an agitating drum.

The mixing temperature is generally 10° to 100° C., preferably 50° to 90° C.

The zeolite-containing composition constructing the catalyst composition of the present invention is imparted with the required properties by the mixing of the slurry (bS) and the slurry (zS). That is not only are the aluminum-containing binder material and the modified zeolite (I) physically mixed (dispersed), but at least a part of the modified zeolite (I) is modified chemically in some stage after the mixing. For this purpose, the chemical modification preferably proceeds to some degree during the mixing stage effectively. It is therefore preferable to carry out the mixing of the slurries at an increased temperature. If the temperature is increased too high, the reaction between the binder and the zeolite may proceed excessively, thereby deteriorating the catalytic functions of the zeolite. On the other hand, if the temperature is too low, the reaction between the binder and the zeolite slows down, so that the effects of the binder in improving the chemical properties (catalytic properties) of the zeolite may sometimes be insufficient, or the mixing may sometimes take a long time to attain the desired properties. It is therefore desirable to carry out the mixing at a temperature increased preferably to 70°–80° C., so that sufficient mixing is performed and the reaction proceeds to a proper degree.

Appropriate mixing time depends on other conditions, such as the mixing temperature, and is generally 0.5 to 50 hours, preferably about 2 to 8 hours. Mixing for less than 0.5 hour may sometimes result in insufficient degree of mixing, and if the mixing time is too long, the reaction of the zeolite with the binder may proceeds excessively, thereby making difficulties, such as deterioration of the properties of the zeolite.

According to demands, other components may be added to the slurry (bS) and/or the slurry (zS) before the mixing, or to the slurry mixture. For example, various components may be added to obtain desired catalytic properties by adding metal components having hydrogenation properties in the form of aqueous solutions.

Thus the objective catalyst composition can be obtained by the mixing. According to demands, the obtained catalyst composition may be subjected to various after treatments, such as filtration, washing, drying, forming and calcination, to obtain products of desired properties. For example, the catalyst composition obtained in the form of slurry may be formed as it is or after proper adjustment of the water content, and then dried and further calcined.

The after treatments, such as the molding, drying and calcination, may be carried out according to the conventional methods, and the order may be varied according to demands. Generally, forming preceding calcination is easier.

The drying may be carried out by various methods, such as drying by heating, air drying, cold drying or vacuum drying, and these methods may be combined.

To obtain a product which is calcined to a proper degree, the calcination is carried out generally at 200° to 750° C., preferably 350° to 700° C., for 0.5 to 10.0 hours.

It is however preferable to select the order of drying, forming and calcination, the conditions thereof and the time when each treatment is carried out, depending on the purposes.

The particle size of the catalyst composition or the shape of the formed product may also be selected in consideration of the purposes of use or following treatments.

According to demands, the catalyst composition slurry, the dried product, the calcined product or the formed product may further be subjected to treatments for imparting desired catalytic properties, for example, loading of desired metal components.

Hereinafter described is an example of the preferred embodiment of the catalyst composition of the present invention, which is improved in the hydrogenation activities by loading metal components having hydrogenating properties.

[Loading of metals having hydrogenation activity]

To use the catalyst composition of the present invention effectively for various hydrogenations, for example, as a hydrogenation catalyst, such as simple hydrogenation catalyst, a hydrocracking catalyst or a hydrodesulfurization catalyst, or as a dehydrogenation catalyst, it is preferable to load it with proper metal components having hydrogenation activity.

For example, the hydrogenation activity of the catalyst composition can be improved by loading at least one metal selected from the group consisting of metals of Groups VIA and VIII of the Periodic Table in the state of metal or metal compound, such as oxide or sulfide, so that the catalyst composition can be suitably used as the various hydrogenation catalysts described above.

The examples of the metals of Groups VIA and VIII of the Periodic Table are the same as those described above. These may be loaded individually or in combination of tow or more. For example, catalysts which are excellent both in hydrodesulfurization and in hydrocracking are generally obtainable by loading Mo and W together with Co or Ni. Such catalysts exhibit excellent catalytic properties even In the hydrocracking of heavy oils.

Although the amounts and ratios of the metal components loaded may be selected depending on purposes, the following ranges are generally appropriate.

For example, if metals of Group VIA of the Periodic Table are loaded, the preferred total amount of the metals loaded is generally 0.01 to 30% by weight calculated as metals based on the amount of the catalyst composition.

If metals of Group VIII of the Periodic Table are loaded, the preferred total amount of the loaded metals is generally 0.03 to 30% by weight calculated as metals based on the amount of the catalyst composition.

The catalyst composition may of course be loaded with both the metals of Group VIA and the metals of Group VIII, with the proviso that the total amount of the metals of each Group is the same as that described above.

There is no particular limitation in the time of loading these metal components, and the loading may be carried out in any stage of the production of the catalyst composition of the present invention. Saying concretely, the loading may be performed by adding compounds of the desired metal components or aqueous solutions thereof, for example, to the slurry (bS) and/or the slurry (zS) or to the mixture of the slurry (bS) and the slurry (zS). It is of course possible to load such metal component on the catalyst composition slurry resulting from the above-described mixing, on the dried product, on the calcined product or on the formed product, or the loading may also be carried out in two or more stages.

As described above, various kinds of catalyst compositions of the present invention (catalyst compositions which comprise zeolite-containing compositions having specific properties) can be obtained by various methods of the present invention which comprise at least the mixing (mixing and reaction) of the slurry (bS) of the above various binders and the slurry (zS) of the above various modified zeolites (I) characterized by the above (1) to (5).

It is important that the catalyst composition of the present invention is a zeolite-containing composition of a catalyst composition containing the zeolite-containing composition which is characterized by the following (i) to (vii). That is, the catalyst composition of the present invention (i) comprises the modified zeolite (II) derived from the modified zeolite (I) and the binder (III) derived from the binder material, the content of the modified zeolite (II) ranging from 10 to 90 % by weight, and the content of the binder (III) being from 10 to 90% by weight;

(ii) has a clear absorption peak in IR spectrum within a wavenumber range of 3602±5 cm$^{-1}$ [the IR spectrum is measured by the above-described method (a)];

(ill) the modified zeolite (II) containing four-coordinate Al in zeolite crystal lattice in an amount which is increased by not less than 0.1% by weight as compared with the content of the four-coordinate Al in zeolite crystal lattice of the modified zeolite (I) [the content of four-coordinate Al is measured and evaluated by the above-described method (b)];

(iv) the modified zeolite (II) having a relative crystallinity measured by X-ray powder diffraction analysis of not less than 35% relative to the unmodified zeolite [the relative crystallinity is measured and evaluated by the above-described method (c)];

(v) the modified zeolite (II) having a U.D. value is increased by not less than 0.001 nm as compared with U.D. value of the modified zeolite (I) [these U.D. values are measured and evaluated by the above-described method (f)];

(vi) the pore size distribution of the catalyst composition having a maximum value within a range of 5 to 50 nm and a maximum value within a range of 50 to 1000 nm, the total pore volume of the catalyst composition being of not less than 0.3 ml/g, the catalyst composition containing not less than 25% by volume of pores of 5 to 50 nm in pore size based on total volume of pores of 5 to 1000 nm in pore size, and containing not less than 10% by volume of pores of 50 to 1000 nm in pore size based on total volume of pores of 5 to 1000 nm in pore size [the pore size distribution is measured and evaluated by the abovedescribed method (d)]; and (vii) the degree of mixing of the modified zeolite (II) and the binder (III) being at least 0.5 [the degree of mixing is measured and evaluated by the above-described method (e)].

The catalyst composition comprising the zeolite-containing composition satisfying these conditions (i) to (vii) has advantages, including its excellent stability, such as its high hydrothermal resistance, since the zeolite component [modified zeolite (II)] in the zeolite-containing composition is improved significantly in the acid properties at least by the physical and chemical effects of the binder and, further, the zeolite component [modified zeolite (II) maintains sufficiently the excellent properties of the modified zeolite (I) used. Therefore, by loading metal components having desired catalytic functions according to demands, the catalyst composition exhibits excellent stability, such as high hydrothermal resistance, and as well exhibits high activity in catalytic reactions.

If the zeolite-containing composition satisfying the conditions (i) to (vii) or the catalyst composition containing the zeolite-containing composition is not used, it will be difficult to attain the objective, excellent catalytic activities and functions.

As described above, since the catalyst composition of the present invention is a novel zeolite-containing composition or a catalyst composition containing the zeolite-containing composition that is a uniform mixture of a binder component and a novel modified zeolite component being excellent in stability, such as hydrothermal resistance, and excelling conventional modified zeolites in acid properties, such as acid density, the catalyst composition of the present invention exhibits excellent catalytic properties (stability, such as hydrothermal resistance, and catalytic activities) endowed by the novel modified zeolite or the zeolite-containing composition. Also the novel catalyst composition may contain or be loaded with other components, such as metal components, which are introduced according to demands to improve various catalytic activities.

The catalyst composition of the present invention comprising the zeolite-containing composition can be used more advantageously as a catalyst or a component (support or the like) thereof for various catalytic reactions, including hydrocrackings, than conventional zeolites or zeolite-containing catalyst compositions. The catalyst composition may also be used more in other application fields than in catalyst fields, for example, as an absorbent.

Examples of the present invention are set forth below. It will be understood that these examples are for purposes of illustration only and are not to be construed as limiting the invention.

EXAMPLES 1 TO 6 AND COMPARATIVE EXAMPLES 1 TO 3

EXAMPLE 1

2 kg of a powdery $NaNH_4$-zeolite Y having a $Na_2O$ content of 1.2% by weight and a $SiO_2/Al_2O_3$ molar ratio of 5.0 was charged in a rotary kiln and then underwent self-steaming at 700° C. for three hours, to obtain a steamed zeolite. To 400 g of the steamed zeolite was added a 1.0 mol/l concentration of hydrochloric acid in an amount of 12 mol of HCl per kg of the steamed zeolite, and the mixture was agitated for two hours at 75° C. After filtration, the solid obtained was washed with warmed water several times, to obtain a slurry of an acid-treated zeolite (modified zeolite).

The properties of the modified zeolite obtained (hereinafter it will be referred to as modified zeolite IA) are listed in Table 1.

An aqueous solution of an aluminum compound (aluminum sulfate) and an aqueous solution of a neutralizer (an aqueous ammonia) were mixed with each other by adding several portions thereof alternately to obtain a boehmite gel, which was then aged at about 90°0 C. for about 12 hours, to obtain an alumina slurry.

To the slurry (water content: 70% by weight) of the modified zeolite IA was added the alumina slurry (water content: 80% by weight) in such a ratio that the modified zeolite IA:the alumina weight ratio (as dried ones) was about 65:35, and the slurry mixture was mixed (kneaded) by a kneader at 70° to 80° C. for two hours. After the water content of the mixture obtained was adjusted to a degree suitable for forming, the mixture was formed into circular cylinders of an effective size of 15 mm, which were then dried at about 110° C. for four hours and was further calcined in air stream at 550° C. for three hours, to obtain a zeolite-containing composition (hereinafter the zeolite-containing composition will be referred to as catalyst composition A).

The properties of the catalyst composition A are listed in Table 2.

The catalyst composition A was impregnated and loaded with a Mo component and a Co component by using an aqueous solution containing ammonium molybdate and cobalt nitrate (the aqueous solution contained 1.1 cc of water per g of the catalyst composition A, ammonium molybdate in such an amount that the resulting catalyst A contained 10% by weight of Mo measured as $MoO_3$, and cobalt nitrate in such an amount that the resulting catalyst A contained 4% by weight of Co measured as CoO). After the impregnation, the loaded composition was dried at 110° C. for four hours and was then calcined in air stream at 550° C. for three hours, to obtain a metal-loaded catalyst composition (hereinafter the metal-loaded catalyst composition will be referred as catalyst A).

The catalyst A contained 56% by weight of a modified zeolite, 30% by weight of alumina, 4% by weight of CoO and 10% by weight of $MoO_3$.

By using the catalyst A as a catalyst, a topped crude was hydrocracked by a fixed-bed flow method under the conditions listed in Table 3, to evaluate the catalytic activities and performance.

A part of the results are listed in Table 3.

EXAMPLE 2

2 kg of a powdery NaNH$_4$-zeolite Y having a Na$_2$O content of 1.2% by weight and a SiO$_2$/Al$_2$O$_3$ molar ratio of 5.0 was charged in a rotary kiln and then underwent self-steaming at 700° C. for three hours, to obtain a steamed zeolite. To 400 g of the steamed zeolite were added 4 kg of a 1.0 mol/l concentration of an aqueous ferric nitrate solution and a 1.5 mol/l concentration of an aqueous nitric acid solution in an amount of 10 mol of HNO$_3$ per kg of the steamed zeolite, and the mixture was agitated for two hours at 75° C. The pit of liquid phase of the mixture was 1.05. After filtration, the solid obtained was washed with warmed water several times, to obtain a slurry of a Fe-containing acid-treated zeolite (Fe-containing modified zeolite).

The properties of the Fe-containing modified zeolite obtained (hereinafter it will be referred to as modified zeolite IB) are listed in Table 1.

To the slurry (water content: 70% by weight) of the modified zeolite IB was added the alumina slurry (water content: 80% by weight) obtained in Example 1 in such a ratio that the modified zeolite IB:the alumina weight ratio (as dried ones) was about 65:35, and the slurry mixture was mixed (kneaded) by a kneader at 70° to 80° C. for two hours. After the water content of the mixture obtained was adjusted to a degree suitable for forming, the mixture was formed into circular cylinders of an effective size of 15 mm, which were then dried at about 110° C. for four hours and was further calcined in air stream at 550° C. for three hours, to obtain a zeolite-containing composition (hereinafter the zeolite-containing composition will be referred to as catalyst composition B).

The properties of the catalyst composition B are listed in Table 2.

The catalyst composition B was impregnated and loaded with a Mo component and a Co component by using an aqueous solution containing ammonium molybdate and cobalt nitrate (the aqueous solution contained 1.1 cc of water per g of the catalyst composition B, ammonium molybdate in such an amount that the resulting catalyst B contained 10% by weight of Mo measured as MoO$_3$, and cobalt nitrate in such an amount that the resulting catalyst B contained 4% by weight of Co measured as CoO). After the impregnation, the loaded composition was dried at 110° C. for four hours and was then calcined in air stream at 550° C. for three hours, to obtain a metal-loaded catalyst composition (hereinafter the metal-loaded catalyst composition will be referred as catalyst B).

The catalyst B contained 56% by weight of a modified zeolite (containing Fe), 30% by weight of alumina, 4% by weight of CoO and 10% by weight of MoO$_3$.

By using the catalyst B as a catalyst, a topped crude was hydrocracked by a fixed-bed flow method under the conditions listed in Table 3, to evaluate the catalytic activities and performance. A part of the results are listed in Table 3.

EXAMPLE 3

2 kg of a powdery NaNH$_4$-zeolite Y having a Na$_2$O content of 1.2% by weight and a SiO$_2$/Al$_2$O$_3$ molar ratio of 5.0 was charged in a rotary kiln and was then steamed with a partial pressure of steam of 0.5 kg/cm$^2$, at 650° C., for three hours, to obtain a steamed zeolite. 400 g of the steamed zeolite was suspended in 5 kg of pure water and was heated to 75° C. with agitation, and thereto was added a 1.5 mol/l concentration of an aqueous nitric acid solution in an amount of 12 mol of HNO$_3$ per kg of the steamed zeolite. After the addition, the mixture was maintained at 75° C. for 30 minutes and was then filtered, to obtain a dealuminated zeolite. 500 g of the dealuminated zeolite was suspended in 3 kg of a 1.0 mol/l concentration of an aqueous cobalt nitrate solution (pH 2.15) and was then heated to 75° C. with agitation. To the suspension was added 5% aqueous ammonia solution to adjust the aqueous solution in the suspension to pH 4.0. After the addition, filtration was carried out to obtain a solid, which was then washed with warmed water several times, to obtain a slurry of a modified zeolite. The properties of the modified zeolite (hereinafter it will be referred to as modified zeolite IC) are listed in Table 1.

To the slurry (water content: 73% by weight) of the modified zeolite IC was added the alumina slurry (water content: 80% by weight) obtained in Example 1 in such a ratio that the modified zeolite IC:the alumina weight ratio (as dried ones) was about 65:35, and the slurry mixture was mixed (kneaded) by a kneader at 70° to 80° C. for two hours. After the water content of the mixture obtained was adjusted to a degree suitable for forming, the mixture was formed into circular cylinders of an effective size of 15 mm, which were then dried at about 110° C. for four hours and was further calcined in air stream at 550° C. for three hours, to obtain a zeolite-containing composition (hereinafter the zeolite-containing composition will be referred to as catalyst composition C). The properties of the catalyst composition C are listed in Table 2.

The catalyst composition C was impregnated and loaded with a Mo component and a Co component by using an aqueous solution containing ammonium molybdate and cobalt nitrate (the aqueous solution contained 1.1 cc of water per g of the catalyst composition C, ammonium molybdate in such an amount that the resulting catalyst C contained 10% by weight of Mo measured as MoO$_3$, and cobalt nitrate in such an amount that the resulting catalyst C contained 4% by weight of Co measured as CoO). After the impregnation, the loaded composition was dried at 110° C. for four hours and was then calcined in air stream at 550° C. for three hours, to obtain a metal-loaded catalyst composition (hereinafter the metal-loaded catalyst composition will be referred as catalyst C). The catalyst C contained 56% by weight of a modified zeolite, 30% by weight of alumina, 4% by weight of CoO and 10% by weight of MoO$_3$.

By using the catalyst C as a catalyst, a topped crude was hydrocracked by a fixed-bed flow method under the conditions listed in Table 3, to evaluate the catalytic activities and performance. A part of the results are listed in Table 3.

EXAMPLE 4

An aqueous solution containing ammonium molybdate and cobalt nitrate was added to the slurry (water content: 70% by weight) of the modified zeolite IA obtained in Example 1, and the mixture was agitated for two hours at 50° C. To the mixture was added the alumina slurry (water content: 80% by weight) obtained in Example 1 in such a ratio that the modified zeolite IA:the alumina weight ratio (as dried ones) was about 65:35, and the slurry mixture was mixed (kneaded) by a kneader at 70° to 80° C. for two hours. After the water content of the mixture obtained was adjusted to a degree suitable for forming, the mixture was formed into circular cylinders of an effective size of 15 mm, which were then dried at about 110° C. for four hours and was further calcined in air stream at 550° C. for three hours, to obtain a zeolite-containing composition (hereinafter the zeolite-containing composition will be referred to as catalyst composition D or catalyst D). The properties of the catalyst composition D are listed in Table 2.

The catalyst composition D contained 56% by weight of a modified zeolite, 30% by weight of alumina, 4 by weight of CoO and 10% by weight of $MoO_3$.

By using the catalyst composition D as a catalyst, a topped crude was hydrocracked by a fixed-bed flow method under the conditions listed in Table 3, to evaluate the catalytic activities and performance. A part of the results are listed in Table 3.

EXAMPLE 5

An aqueous solution containing ammonium molybdate and cobalt nitrate was added to the alumina slurry (water content: 80% by weight) obtained in Example 1, and the mixture was agitated for two hours at 50° C. To the mixture was added the slurry (water content: 70% by weight) of the modified zeolite IA obtained in Example 1 in such a ratio that the modified zeolite IA: the alumina weight ratio (as dried ones) was about 65:35, and the slurry mixture was mixed (kneaded) by a kneader at 70° to 80° C. for two hours. After the water content of the mixture obtained was adjusted to a degree suitable for forming, the mixture was formed into circular cylinders of an effective size of 15 mm, which were then dried at about 110° C. for four hours and was further calcined in air stream at 550° C. for three hours, to obtain a zeolite-containing composition (hereinafter the zeolite-containing composition will be referred to as catalyst composition E or catalyst E). The properties of the catalyst composition E are listed in Table 2.

The catalyst composition E contained 56% by weight of a modified zeolite, 30% by weight of alumina, 4% by weight of CoO and 10% by weight of $MoO_3$.

By using the catalyst composition E as a catalyst, a topped crude was hydrocracked by a fixed-bed flow method under the conditions listed in Table 3, to evaluate the catalytic activities and performance. A part of the results are listed in Table 3.

EXAMPLE 6

To the slurry (water content: 70% by weight) of the modified zeolite IA obtained in Example 1 was added the alumina slurry (water content: 80% by weight) obtained in Example 1 in such a ratio that the modified zeolite IA:the alumina weight ratio (as dried ones) was about 65:35, and the slurry mixture was mixed (kneaded) by a kneader at 70° to 80° C. for two hours. After the water content of the mixture obtained was adjusted to a degree suitable for forming, the mixture was formed into circular cylinders of an effective size of 15 mm, which were then dried at about 110° C. for four hours and was further calcined in air stream at 550° C. for three hours, to obtain a zeolite-containing composition (hereinafter the zeolite-containing composition will be referred to as catalyst composition F or catalyst F). The properties of the catalyst composition F are listed in Table 2.

The catalyst composition F contained 56% by weight of a modified zeolite, 30% by weight of alumina, 4% by weight of CoO and 10% by weight of $MoO_3$.

By using the catalyst composition F as a catalyst, a topped crude was hydrocracked by a fixed-bed flow method under the conditions listed in Table 3, to evaluate the catalytic activities and performance. A part of the results are listed in Table 3.

COMPARATIVE EXAMPLE 1

The slurry (water content: 70% by weight) of the modified zeolite IA obtained in Example 1 was dried at 110° C. for four hours, to obtain a powdery modified zeolite IA (water content: 28% by weight). The alumina slurry (water content: 80% by weight) obtained in Example 1 was dried by heating to decrease the water content and to obtain an alumina paste (water content: 50% by weight).

To the powdery modified zeolite IA (water content: 28% by weight) was added the alumina paste (water content: 50% by weight) in such a ratio that the modified zeolite IA:the alumina weight ratio (as dried ones) was about 65:35, and the slurry mixture was mixed (kneaded) by a kneader at 70° to 80° C. for 0.5 hour. After the water content of the mixture obtained was adjusted to a degree suitable for forming, the mixture was formed into circular cylinders of an effective size of 15 mm, which were then dried at about 110° C. for four hours and was further calcined In air stream at 550° C. for three hours, to obtain a zeolite-containing composition for comparison (hereinafter the zeolite-containing composition will be referred to as catalyst composition RA). The properties of the catalyst composition RA are listed in Table 2.

The catalyst composition RA was impregnated and loaded with a Mo component and a Co component by using an aqueous solution containing ammonium molybdate and cobalt nitrate In the same manner as in Example 1. After the impregnation, the loaded composition was dried at 110° C. for four hours and was then calcined in air stream at 550° C. for three hours, to obtain a metal-loaded catalyst composition for comparison (hereinafter the metal-loaded catalyst composition will be referred to as catalyst RA). The catalyst RA contained 56% by weight of a modified zeolite, 30% by weight of alumina, 4% by weight of CoO and 10% by weight of $MoO_3$.

By using the catalyst RA as a catalyst, a topped crude was hydrocracked by a fixed-bed flow method under the conditions listed in Table 3, to evaluate the catalytic activities and performance. A part of the results are listed in Table 3.

COMPARATIVE EXAMPLE 2

The slurry (water content: 70% by weight) of the modified zeolite IB obtained in Example 2 was dried at 110° C. for four hours, to obtain a powdery modified zeolite IB (water content: 31% by weight). The alumina slurry (water content: 80% by weight) obtained in Example 1 was dried by heating to decrease the water content and to obtain an alumina paste (water content: 50% by weight).

To the powdery modified zeolite IB (water content: 31% by weight) was added the alumina paste (water content: 50% by weight) in such a ratio that the modified zeolite IB:the alumina weight ratio (as dried ones) was about 65:35, and the slurry mixture was mixed (kneaded) by a kneader at 70° to 80° C. for 0.5 hour. After the water content of the mixture obtained was adjusted to a degree suitable for forming, the mixture was formed into circular cylinders of an effective size of 15 mm, which were then dried at about 110° C. for four hours and was further calcined in air stream at 550° C. for three hours, to obtain a zeolite-containing composition for comparison (hereinafter the zeolite-containing composition will be referred to as catalyst composition RB). The properties of the catalyst composition RB are listed in Table 2.

The catalyst composition RB was impregnated and loaded with a Mo component and a Co component by using an aqueous solution containing ammonium molybdate and cobalt nitrate in the same manner as in Example 1. After the impregnation, the loaded composition was dried at 110° C.

for four hours and was then calcined in air stream at 550° C. for three hours, to obtain a metal-loaded catalyst composition for comparison (hereinafter the metal-loaded catalyst composition will be referred as catalyst RB). The catalyst RB contained 56% by weight of a modified zeolite, 30% by weight of alumina, 4% by weight of CoO and 10% by weight of $MoO_3$.

By using the catalyst RB as a catalyst, a topped crude was hydrocracked by a fixed-bed flow method under the conditions listed in Table 3, to evaluate the catalytic activities and performance. A part of the results are listed in Table 3.

COMPARATIVE EXAMPLE 3

The slurry (water content: 70% by weight) of the modified zeolite IC obtained in Example 3 was dried at 110° C. for four hours, to obtain a powdery modified zeolite IB (water content: 20% by weight). The alumina slurry (water content: 80% by weight) obtained in Example 1 was dried by heating to decrease the water content and to obtain an alumina paste (water content: 50% by weight).

To the powdery modified zeolite IC (water content: 20% by weight) was added the alumina paste (water content: 50% by weight) in such a ratio that the modified zeolite IB:the alumina weight ratio (as dried ones) was about 65:35, and the slurry mixture was mixed (kneaded) by a kneader at 70° to 80° C. for 0.5 hour. After the water content of the mixture obtained was adjusted to a degree suitable for forming, the mixture was formed into circular cylinders of an effective size of 15 mm, which were then dried at about 110° C. for four hours and was further calcined in air stream at 550° C. for three hours, to obtain a zeolite-containing composition for comparison (hereinafter the zeolite-containing composition will be referred to as catalyst composition RC). The properties of the catalyst composition RC are listed in Table 2.

The catalyst composition RC was impregnated and loaded with a Mo component and a Co component by using an aqueous solution containing ammonium molybdate and cobalt nitrate in the same manner as in Example 1. After the impregnation, the loaded composition was dried at 110° C. for four hours and was then calcined in air stream at 550° C. for three hours, to obtain a metal-loaded catalyst composition for comparison (hereinafter the metal-loaded catalyst composition will be referred as catalyst RC). The catalyst RC contained 56% by weight of a modified zeolite, 30% by weight of alumina, 4% by weight of CoO and 10% by weight of $MoO_3$.

By using the catalyst RC as a catalyst, a topped crude was hydrocracked by a fixed-bed flow method under the conditions listed in Table 3, to evaluate the catalytic activities and performance. A part of the results are listed in Table 3. The values of the properties listed in Table 1 and Table 2 were measured and evaluated by the above methods (a) to (f).

TABLE 1

| Modified zeolite | IA | IB | IC |
|---|---|---|---|
| $SiO_2/Al_2O_3$ | 43 | 40 | 32 |
| IR (3602)[A] (—) | 0.00 | 0.00 | 0.00 |
| Al in lattice (wt %) | 1.51 | 1.62 | 1.97 |
| Relative crystallinity (%) | 86 | 82 | 79 |
| FPV (%)[B] | 30 | 33 | 27 |
| Content of metal loaded[C] (wt %) | 0.0 | 5.0(Fe) | 6.9(Co) |

[A] The absorbancy of the 3602.5 $cm^{-1}$ peak in IR spectrum.
[B] FPV = [PV(3–30 nm)/PV(total pore volume)] × 100 (%) PV (a–b nm) represents the total pore volume of pores having pore sizes of a to b nm.
[C] Concentration measured as an oxide.

TABLE 2

| | Example Nos. | | | | | | Comparative Example Nos. | | |
|---|---|---|---|---|---|---|---|---|---|
| | 1 | 2 | 3 | 4 | 5 | 6 | 1 | 2 | 3 |
| Material zeolite* | IA | IB | IC | IA | IB | IC | IA | IB | IC |
| Catalyst composition | A | B | C | D | E | F | RA | RB | RC |
| IR (3602) (—)[D] | 0.26 | 0.30 | 0.31 | 0.29 | 0.27 | 0.31 | 0.00 | 0.00 | 0.00 |
| Increase of Al in lattice (wt %)[E] | 0.41 | 0.50 | 0.39 | 0.42 | 0.38 | 0.36 | 0.02 | 0.04 | 0.01 |
| Relative crystallinity (%)[F] | 82 | 74 | 71 | 77 | 73 | 72 | 84 | 77 | 76 |
| Increase of U.D. (nm)[G] | 0.003 | 0.003 | 0.002 | 0.002 | 0.003 | 0.002 | 0.000 | 0.000 | 0.000 |
| Pore volume and pore size distribution[H] | | | | | | | | | |
| PV (ml) | 0.55 | 0.45 | 0.57 | 0.47 | 0.50 | 0.52 | 0.50 | 0.51 | 0.40 |
| FPV1 (%) | 49 | 47 | 45 | 48 | 45 | 45 | 39 | 41 | 38 |
| FPV2 (%) | 51 | 53 | 55 | 52 | 55 | 55 | 61 | 59 | 62 |
| Degree of mixing (—) | 0.68 | 0.72 | 0.80 | 0.71 | 0.62 | 0.72 | 0.10 | 0.14 | 0.04 |

*Modified zeolites which are listed in Table 1 (Examples 1 to 6: slurries, Comparative Examples 1 to 3: powder)
[D] Absorbancy of 3602 ± 5 $cm^{-1}$ peak in IR spectrum.
[E] The increase of Al in zeolite lattice after the mixing of a zeolite and a binder.
[F] The relative crystallinity of a zeolite in a catalyst composition.
[G] The increase in the U.D. of a zeolite after mixing of the zeolite and a binder.
[H] PV = total pore volume
FPV1 = [PV(5–50 nm)/PV(5–1000 nm)] × 100 (%)
FPV2 = [PV(50–1000 nm)/PV(5–1000 nm)] × 100 (%)

As compared with Comparative Examples, the data of Examples show clear peaks at 3602±5 $cm^{-1}$ in IR spectra, sufficient increases in U.D. values and high degrees of mixing between modified zeolites and binders.

TABLE 3

|  | Example Nos. | | | | | | Comparative Example Nos. | | |
| --- | --- | --- | --- | --- | --- | --- | --- | --- | --- |
|  | 1 | 2 | 3 | 4 | 5 | 6 | 1 | 2 | 3 |
| Catalyst | A | B | C | D | E | F | RA | RB | RC |
| Reaction conditions | | | | | | | | | |
| Temperature (°C.) | 400 | 400 | 400 | 400 | 400 | 400 | 400 | 400 | 400 |
| $H_2$ pressure ($kg/cm^2$) | 135 | 135 | 135 | 135 | 135 | 135 | 135 | 135 | 135 |
| $H_2$/Topped crude ($Nm^3/kl$) | 2,000 | 2,000 | 2,000 | 2,000 | 2,000 | 2,000 | 2,000 | 2,000 | 2,000 |
| LHSV ($h^{-1}$) | 0.3 | 0.3 | 0.3 | 0.3 | 0.3 | 0.3 | 0.3 | 0.3 | 0.3 |
| Catalytic activities | | | | | | | | | |
| Percentage of 343 + °C. distillates cracked (wt %) | 54.8 | 50.5 | 48.1 | 54.1 | 52.6 | 51.5 | 26.2 | 25.1 | 29.6 |
| Yields of middle distillates[1] (wt %) | 29.1 | 26.0 | 28.0 | 27.1 | 25.2 | 26.3 | 20.6 | 19.3 | 21.5 |
| Desulfurization activity (wt %) | 83.2 | 84.0 | 84.2 | 83.1 | 83.3 | 84.1 | 82.0 | 80.3 | 82.1 |

[1]Middle distillates are hydrocarbon oils of boiling points of 157° C. to 343° C.

As compared with the Comparative Examples, the Examples produced higher cracking percentages, higher yields of middle distillates and higher desulfurization activity.

The catalyst composition of the present invention is prepared by a specific method comprising slurry-mixing a slurry of a modified zeolite specified in its composition and properties and a slurry of a binder, thereby performing the mixing and reaction between the zeolite and the binder with a high degree of mixing, and is a novel zeolite-containing composition or a catalyst composition containing the zeolite-containing composition that is obtainable only by the specific method. The zeolite-containing composition constructing the catalyst composition is excellent in stability, such as hydrothermal resistance, and comprises a specific modified zeolite component, which has excellent catalytic properties, for example excellent acid properties, such as high acid density, that the conventional modified zeolites are lacking in, and a specific alumina-type binder component, which endows the catalyst composition with high mechanical strength and excellent pore size distribution characteristics necessary in practical use.

The catalyst composition of the present invention comprising the zeolite-composition is very useful in practical applications since when used as a catalyst of a catalyst component thereof in various reactions, not only does it exhibit excellent catalytic properties, such as high hydrothermal resistance and high stability, due at east to the zeolite-containing composition or the modified zeolite, but it exhibits far higher catalytic activities than those of the conventional modified-zeolite-type catalysts.

Since the catalyst composition may support or contain other catalyst components, such as metal components effective in catalyzing various catalytic reactions, it can be used advantageously as a catalyst or material thereof in various catalytic processes on hydrocarbons, for example hydrogenation reactions, such as hydrocracking, hydrodesulfurization and simple hydrogenation, and further isomerization, alkylation, dealkylation, disproportionation and catalytic reforming.

That is, the present invention provides a novel catalyst composition containing a zeolite-containing composition which has high hydrothermal resistance and as well exhibits sufficiently high activities in various catalytic reactions, including various hydrocarbon-conversion reactions.

What is claimed is:

1. A catalyst composition, comprising (a) 10 to 90% by weight of a modified zeolite Y (II) formed from a modified zeolite Y (I) and (b) 10 to 90% by weight of a binder (III) formed from a binder material containing an aluminum compound, in a degree of mixing of not less than 0.5, the catalyst composition having a clear absorption peak in an IR spectrum of a wavelength of 3602±5 $cm^{-1}$, the catalyst composition having a pore size distribution which has a maximum value of 5 to 50 nm and a maximum value of 50 to 1000 nm, the catalyst composition having a total pore volume of not less than 0.3 ml/g, containing not less than 25% by volume of pores of 5 to 50 nm in a pore size based on a total volume of pores of a pore size of 5 to 1000 nm, containing not less than 10% by volume of pores of 50 to 1000 nm in a pore size based on a total volume of pores of a pore size of 5 to 1000 nm, the catalyst composition being prepared by mixing a first slurry (bS) of the binder material and a second slurry (zS) of the modified zeolite Y (I), the modified zeolite Y (I) being prepared by modifying an unmodified zeolite Y having a $SiO_2/Al_3O_3$ molar ratio of not less than 3.5, by (i) steaming and by a wet acid treatment, or (ii) by steaming, a wet acid treatment and treatment with an aqueous metal salt solution which contains at least one salt of at least one metal selected from the group consisting of metals of Group VIA and Group VIII of the Periodic Table and has a pH of 2.0 to 12.0, or (iii) by steaming and by treatment with an aqueous metal salt solution which contains at least one salt of at least one metal selected from the group consisting of metals of Group VIA and Group VIII of the Periodic Table and has a pH of lower than 1.5, the modified zeolite Y (I) having a $SiO_2/Al_2O_3$ molar ratio of not less than 7, having no clear absorption peak in an IR spectrum of a wavelength of 3602±5 $cm^{-1}$, containing not more than 14% by weight of four-coordinate Al in a zeolite crystal lattice, as measured by a solid NMR method, having a relative crystallinity measured by X-ray powder diffraction analysis of not less than 40% relative to the unmodified zeolite Y and containing not less than 20% by volume of pores of 3 to 30 nm in a pore size based on a total pore volume, the modified zeolite Y (II) containing four-coordinate Al in a zeolite crystal lattice in an amount which is increased by not less than 0.1% by weight as compared with the content of the four-coordinate Al in the zeolite crystal lattice of the modified zeolite Y (I), having a relative crystallinity measured by X-ray powder diffraction analysis of not less than 35% relative to the unmodified zeolite and having a U.D. value which is increased by not less than 0.001 nm as compared with the U.D. value of the modified zeolite Y (I).

2. The catalyst composition of claim 1, wherein the binder material and the binder (III) comprise at least one selected from the group consisting of alumina, silica-alumina, alumina-boria, clay and a mixture thereof.

3. The catalyst composition of claim 1, wherein the modified zeolite Y (I) contains at least one metal or metal compound of a metal selected from the group of metals of Groups VIA and VIII of the Periodic Table.

4. The catalyst composition of claim 3, wherein when the modified zeolite Y (I) contains a metal or metal compound of at least one metal of Group VIA of the Periodic Table, the metal or metal compound of the metal of Group VIA of the Periodic Table is contained in an amount of 0.01 to 30 by weight, measured as metal, and when the modified zeolite Y (I) contains a metal or metal compound of at least one metal of Group VIII of the Periodic Table, the metal or metal compound of the metal of Group VIII of the Periodic Table is contained in an amount of 0.03 to 30% by weight, measured as metal, all based on the total of the modified zeolite Y (II) and the binder (III).

5. The catalyst composition of claim 1 which further comprises at least one metal or metal compound of at least one metal selected from the group consisting of metals of Group VIA and Group VIII of the Periodic Table.

6. The catalyst composition of claim 1 which further comprises at least one metal or metal compound of at least one metal of Group VIA of the Periodic Table and at least one metal or metal compound of at least one metal of Group VIII of the Periodic Table, the amount of the metal or metal compound of the metal of Group VIA of the Periodic Table being 0.01 to 30% by weight, measured as metal, and the amount of the metal or metal compound of the metal of Group VIII of the Periodic Table being 0.03 to 30% by weight, measured as metal, all based on the total of the modified zeolite Y (II) and the binder (III).

7. The catalyst composition of claim 1, wherein the binder material is selected from the group consisting of at least one of alumina, silica-alumina, alumina-boria, silica-alumina-thoria, silica-alumina-zirconia, silica-alumina-magnesia and aluminum-containing clays; the modified zeolite comprising a metal selected from the group consisting of Mo, W, Fe, Co, Ni, Ru, Rh, Pd, Os, Ir and Pt; the first slurry having a water content of 65 to 99% by weight and having fine grains of the binder material of a grain size not greater than 200 μm; the second slurry having a water content of 35 to 99% by weight; and the binder (III) and the modified zeolite (II) being in a weight ratio of 1/9 to 9/1.

8. The catalyst composition as claimed in claim 1, wherein the binder material is alumina; the modified zeolite Y (I) is prepared by modifying the unmodified zeolite Y by steaming and a wet acid treatment; the catalyst composition further comprises 0.01 to 30% by weight of Mo, measured as metal, and 0.03 to 30% by weight of Co, measured as metal; the first slurry (bS) has a water content of 65 to 99% by weight and having fine grains of the binder material of a grain size not greater than 200 μm; and the second slurry (zS) has a water content of 35 to 99% by weight.

9. The catalyst composition as claimed in claim 1, wherein the binder material is alumina; the modified zeolite Y (I) is prepared by modifying the unmodified zeolite Y by steaming and by treatment with an aqueous metal salt solution which contains a salt of Fe and has a pH of lower than 1.5, so that the modified zeolite (I) contains Fe; the catalyst composition further comprises Mo and Co, Mo being 0.01 to 30% by weight, measured as metal, a total of Fe and Co being 0.03 to 30% by weight, measured as metal, all based on a total of the modified zeolite Y (II) and the binder (III); the first slurry (bS) has a water content of 65 to 99% by weight and having fine grains of the binder material of a grain size not greater than 200 μm; and the second slurry (zS) has a water content of 35 to 99% by weight.

10. The catalyst composition as claimed in claim 1, wherein the binder material is alumina; the modified zeolite Y (I) is prepared by modifying the unmodified zeolite Y by steaming, and an acid treatment and a treatment with an aqueous metal salt solution which contains a salt of Fe and has a pH of 2.0 to 12.0, so that the modified zeolite (I) contains Fe; the catalyst composition further comprises Mo and Co, Mo being 0.01 to 30% by weight, measured as metal, a total of Fe and Co being 0.03 to 30% by weight, measured as metal, all based on a total of the modified zeolite Y (II) and the binder (III); the first slurry (bS) has a water content of 65 to 99% by weight and having fine grains of the binder material of a grain size not greater than 200 μm; and the second slurry (zS) has a water content of 35 to 99% by weight.

* * * * *